United States Patent
Pajovic et al.

(10) Patent No.: US 9,641,357 B1
(45) Date of Patent: May 2, 2017

(54) SYSTEM AND METHOD FOR MMWAVE CHANNEL ESTIMATION

(71) Applicant: Mitsubishi Electric Research Laboratories, Inc., Cambridge, MA (US)

(72) Inventors: Milutin Pajovic, Cambridge, MA (US); Raj Tejas Suryaprakash, Ann Arbor, MI (US); Philip Orlik, Cambridge, MA (US); Kyeong Jin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/004,107

(22) Filed: Jan. 22, 2016

(51) Int. Cl.
*H04L 25/02* (2006.01)
*H04B 7/06* (2006.01)

(52) U.S. Cl.
CPC ....... *H04L 25/0224* (2013.01); *H04B 7/0626* (2013.01); *H04L 25/0242* (2013.01)

(58) Field of Classification Search
CPC ............ H04L 25/0224; H04L 25/0242; H04B 7/0626
USPC ......................... 375/316, 324, 347
See application file for complete search history.

(56) References Cited

U.S. PATENT DOCUMENTS

| | | | |
|---|---|---|---|
| 2007/0076669 A1* | 4/2007 | Boroujeny | H03M 13/47 370/335 |
| 2011/0207489 A1* | 8/2011 | DeLuca | H04W 72/1205 455/509 |
| 2012/0076216 A1* | 3/2012 | Zhang | H04L 1/0071 375/259 |
| 2013/0322583 A1 | 12/2013 | Doron et al. | |
| 2015/0003542 A1* | 1/2015 | Barbu | H04L 25/0218 375/260 |

OTHER PUBLICATIONS

Mendez-Rial et al. "Channel Estimation and Hybrid Combining for mm Wave: Phase Shifters or Switches?" Proc. of Information Theory and Applications Workshop, Feb. 2015.

* cited by examiner

*Primary Examiner* — Freshteh N Aghdam
(74) *Attorney, Agent, or Firm* — Gene Vinokur; James McAleenan; Hironori Tsukamoto

(57) ABSTRACT

A method for decoding a symbol transmitted over a millimeter wave (mmWave) channel estimates channel state information (CSI) of the mmWave channel using a Bayesian inference on a test symbol according to a probabilistic model of the mmWave channel including statistics on paths and spread of mmWaves propagating in the mmWave channel and decodes a symbol received over the mmWave channel using the CSI.

20 Claims, 13 Drawing Sheets

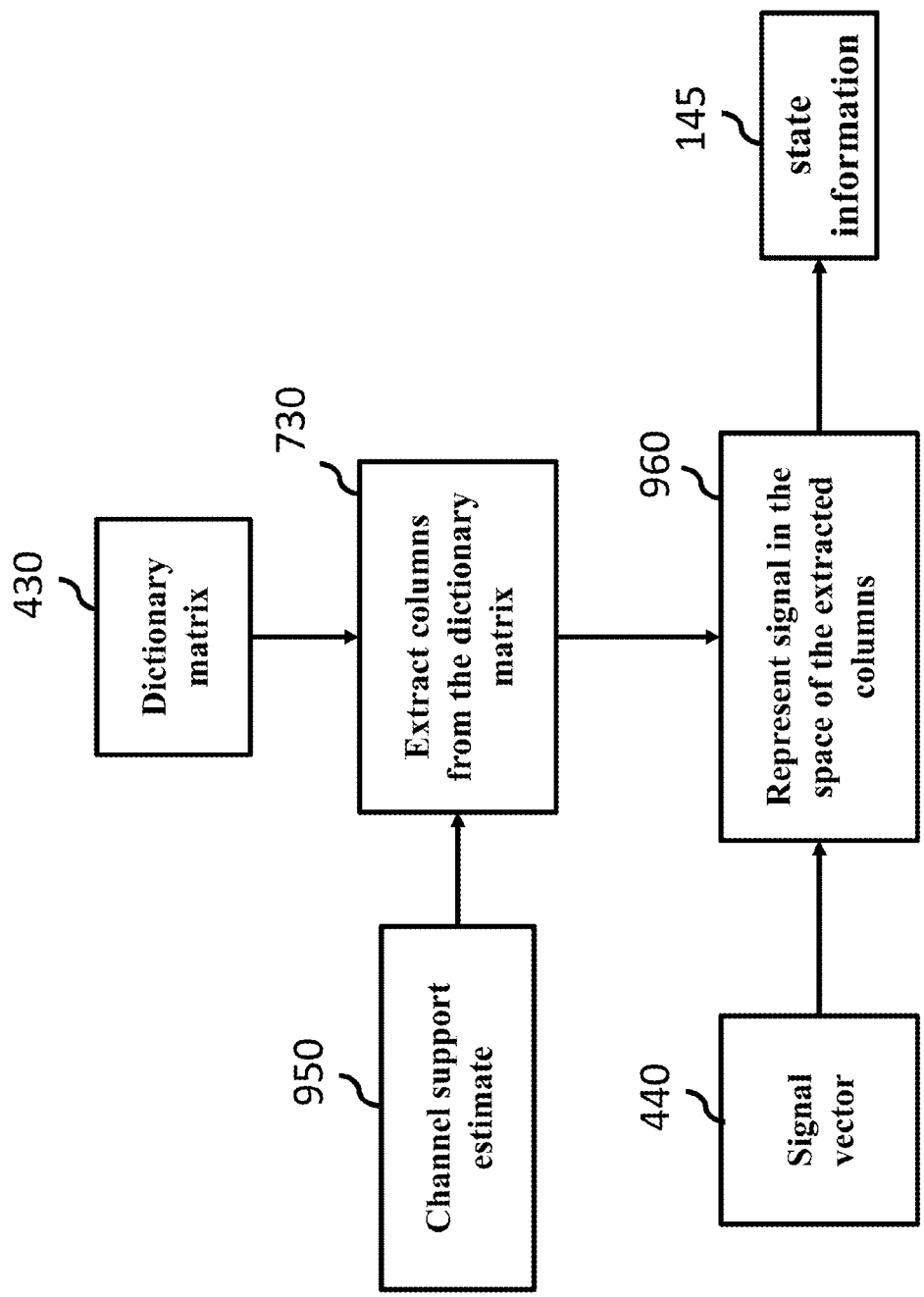

SYSTEM AND METHOD FOR MMWAVE CHANNEL ESTIMATION

FIELD OF THE INVENTION

This invention relates generally to communications systems, and more particularly to channel estimation in mmWave communication system.

BACKGROUND OF THE INVENTION

Millimeter Waves (mmWaves) are radio waves with wavelength in the range of 1 millimeter (mm)-10 mm, which corresponds to a radio frequency of 30 GigaHertz (GHz)-300 GHz. Per the definition by the International Telecommunications Union (ITU), these frequencies are also referred to as the Extremely High Frequency (EHF) band.

The mmWaves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., rain drops) in the air. On the other hand, due to the smaller wavelengths of the mmWaves, more antennas may be packed in a relatively small area, thereby allowing for the implementation of a high-gain antenna in small form factor.

The mmWaves have been less utilized than the lower frequency radio waves. A vast amount of spectrum is available in the mmWave band. For example, the frequencies around 60 GHz, which are typically referred to as the 60 GHz band, are available as unlicensed spectrum in most countries.

In wireless communications, channel state information (CSI) refers to known channel properties of a communication link. This information describes how a signal propagates from the transmitter to the receiver and represents the combined effect of, for example, scattering, fading, and power decay with distance. The CSI makes it possible to adapt transmissions to current channel conditions for achieving reliable communication with high data rates in multiantenna systems. The CSI needs to be estimated at the receiver, but can be quantized and fed back to the transmitter (although reverse-link estimation is possible). The transmitter and receiver can have different CSI.

Accurate CSI estimation is desirable in order to take advantage of the potential of mmWave network capacity. In particular, with accurate CSI estimation, CSI can be exploited for optimum or quasi-optimum precoder and equalizer designs with the purpose of maximizing system performance. A number of different methods are developed for estimating CSI. However, the CSI estimation methods developed for lower frequency radio waves are not always suitable for mmWaves channel estimation due to differences in the physical characteristics of the waves.

One method, described by Roi Mendez-Rial in "Channel Estimation and Hybrid Combining for mmWave: Phase Shifters or Switches," estimates the mmWave channel using the sparse recovery formulation of the channel. However, such a formulation does not accurately represent different properties of the mmWave channel, which makes this method less accurate.

SUMMARY OF THE INVENTION

Some embodiments of an invention are based on recognition that a millimeter wave (mmWave) channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile. Accordingly, it is an object of some embodiments of the invention to improve a performance of mmWave channel estimation performance by exploiting different properties of mmWaves propagation.

For example, one embodiment of the invention exploits sparsity of the mmWave channel in the number of arrivals. The channel estimation problem can be formulated as a problem of sparse representation of the received channel sensing signals in a redundant dictionary. Additionally, some embodiments aim to incorporate the spread of the mmWaves in the angular (spatial) domain into the estimation method. Unfortunately, it is difficult to analytically determine the spread of the mmWaves for different types of the mmWave channel. However, some embodiments of the invention are based on realization that the spread of the mmWaves can be estimated probabilistically in dependence on the environment of the mmWave channel. For example, the spread of the mmWaves is probabilistically similar for mmWave channels in different office buildings, but probabilistically different from the mmWave channels in residential areas. Thus, knowing the environment of the mmWave channel allows knowing the probabilistic distribution of the spread of the mmWaves in the channel.

In addition, the probability of sparse distribution of the mmWaves also depends on the environment of the channel and can be predetermined. Because different properties of the mmWave propagation can be determined probabilistically, some embodiments frame the channel estimation problem as a Bayesian inference problem.

Accordingly, one embodiment discloses a method for decoding a symbol transmitted over a millimeter wave (mmWave) channel. The method includes receiving a test symbol transmitted over the mmWave channel; estimating channel state information (CSI) of the mmWave channel using a Bayesian inference on the test symbol according to a probabilistic model of the mmWave channel including statistics on paths and spread of mmWaves propagating in the mmWave channel; receiving a symbol over the mmWave channel; and decoding the symbol using the CSI. The steps of the method are performed by a processor of a receiver.

Another embodiment discloses a receiver for receiving and decoding symbols transmitted over a millimeter wave (mmWave) channel, including a set of antennas to receive symbols transmitted over the mmWave channel; a front end to convert the symbols into a test symbol and a data symbol; a processor to estimate channel state information (CSI) of the mmWave channel using a Bayesian inference on the test symbol according to a probabilistic model of the mmWave channel including statistics on paths and spread of mmWaves propagating in the mmWave channel; and a decoder to decode the symbol using the CSI.

Yet another embodiment discloses a computer implemented method for decoding a symbol transmitted over a millimeter wave (mmWave) channel including estimating channel state information (CSI) of the mmWave channel using a Bayesian inference on a test symbol received over the mmWave channel, wherein the estimating is according to a probabilistic model of the mmWave channel including statistics on paths and spread of mmWaves propagating in the mmWave channel; and decoding a symbol received over the mmWave channel using the CSI. The steps of the method are performed by a processor of a receiver.

BRIEF DESCRIPTION OF THE DRAWINGS

FIG. 10 shows a block diagram of a method for determining the channel coefficients according to one embodiment of the invention.

DETAILED DESCRIPTION OF THE PREFERRED EMBODIMENT

Figure 1A:
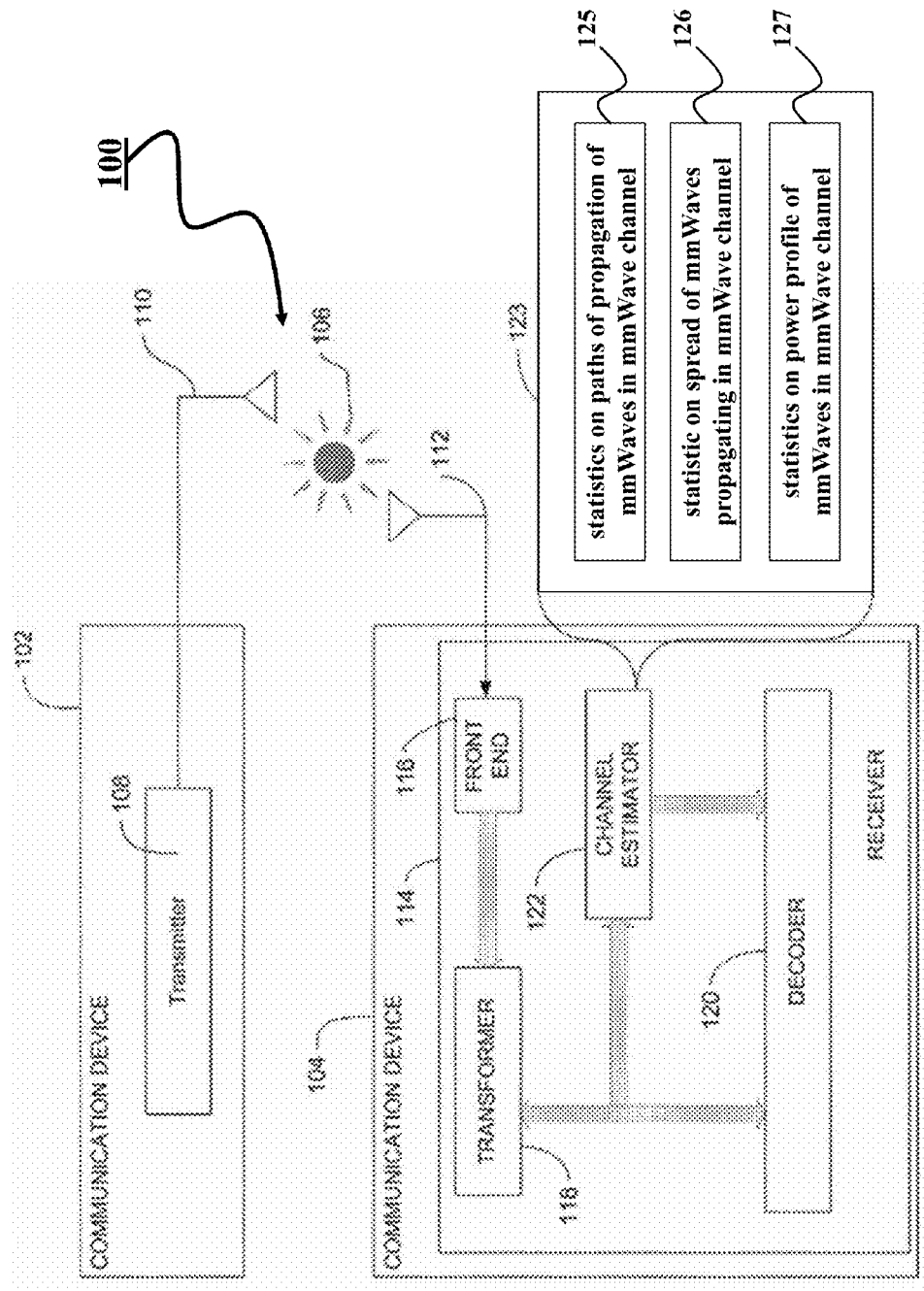
FIG. 1A shows a schematic of a wireless communication system 100 in accordance with one embodiment of an invention.

FIG. 1A shows a schematic of a wireless communication system 100 in accordance with one embodiment of an invention. The communication system 100 includes a first communication device 102 able to communicate with a second communication device 104 over a communication channel 106. The communication channel 106 is a millimeter wave (mmWave) channel. In various industries, the mmWaves band refers to frequencies between 6 GigaHertz (GHz) and 300 GHz. For example, the device 102 and/or device 104 can communicate with each other in accordance with the 802.11ad standard.

For example, the device 102 includes Ntx antennas 110 and the device 104 includes Nrx antennas 112 to transmit a single data stream over the channel 106 by a single antenna or over multiple antennas using beamforming and/or spatial multiplexing. The single data stream can be split into multiple sub-data streams that are then individually and simultaneously transmitted over the same communication channel such as channel 106 from the multiple antennas. Although the scope of the present invention is not limited in this respect, types of antennas used by various embodiments for antennas 110 and/or 112 include but are not limited to internal antenna, dipole antenna, omni-directional antenna, a monopole antenna, an end fed antenna, a circularly polarized antenna, a micro-strip antenna, a diversity antenna and the like.

The communication device 102 includes a transmitter 108 to transmit a beam-formed transmission by transmitting the data stream via Ntx antennas 110, respectively. The communication device 104 includes a receiver 114 to receive the data stream over the channel 106 via the Nrx antennas 112. The received signal may include symbols corresponding, for example, to symbols of the signal transmitted by transmitter 108.

In some embodiments, the receiver 114 includes a front end 116 and/or a transformer 118. The front end 116 can include any suitable front end module to convert a time-domain signal received from antenna 112 into a time-domain signal of a format suitable for transformer 118. Transformer 118 may transform the signal into a plurality of different types of signals that are suitable for a decoder 120 or a channel estimator 122. For example, the frond end can convert the received signal into a symbol suitable for the decoding.

The receiver 114 also includes a channel estimator 122 to generate a signal representing channel estimation. The receiver 114 can also include a decoder 120 to decode the received signal and to generate signal representing an estimation of the signal transmitted by the device 102. The channel estimator 122 uses a probabilistic model for the mmWave propagation in the environment of the channel 106.

In various embodiments of the invention the channel estimator 122 is a probabilistic estimator that frames the channel estimation problem as a Bayesian inference problem using a probabilistic model 123 of the mmWave channel 106. Some embodiments of an invention are based on recognition that mmWave channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile.

Unfortunately, it is difficult to determine the properties of the mmWave propagation deterministically. However, some embodiments of the invention are based on realization that those properties can be determined pobabilistically in dependence on the environment of the mmWave channel. For example, the sparsity and/or the spread of the mmWaves are probabilistically similar for mmWave channels in different office buildings, but probabilistically different from the mmWave channels in residential areas. Thus, knowing the environment of the mmWave channel allows knowing the probability of different properties of mmWave propagation.

Due to the spread, each or some of the mmWaves are received as a cluster of waves. To that end, some embodiments of the invention determine the statistics on the properties of the mmWave propagation as an equivalent to the statistics on the cluster of the mmWaves. For example, in various embodiments, the probabilistic model 123 includes one or combination of statistics 125 on paths of propagation of the mmWaves in the mmWave channel and statistics 126 on spread of mmWaves propagating in the mmWave channel. In some embodiments, the probabilistic model 123 also includes statistics 127 on power profile of the mmWaves modeling the intensity of mmWaves across their respective angular spreads in the channel 106. Because different properties of the mmWave propagation can be determined probabilistically, some embodiments frame the channel estimation problem as a Bayesian inference problem.

Figure 1B:
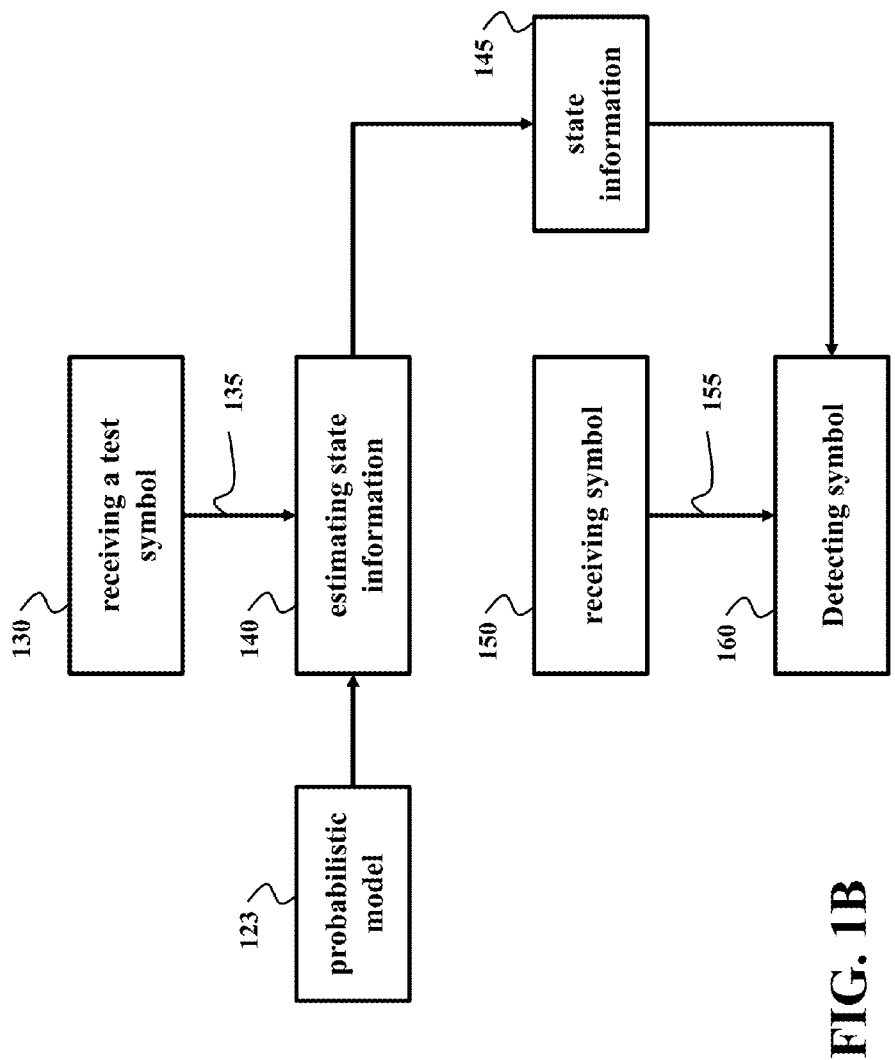
FIG. 1B shows a block diagram of a method for decoding a symbol transmitted over the mmWave channel according to one embodiment of the invention

FIG. 1B shows a block diagram of a method for decoding a symbol transmitted over the mmWave channel according to one embodiment of the invention. The method receives 130 a test symbol 135 transmitted over the mmWave channel and estimates 140 state information 145 of the mmWave channel using a Bayesian inference on the test symbol 135. The value of the test symbol is known and the estimation is performed according to a probabilistic model 123 of the mmWave channel that includes statistics on paths 125 and spread 126 of mmWaves propagating in the mmWave channel. When the method receives 150 a symbol 155, e.g., a data symbol, the method detects 160 the symbol 155 using the state information 145 of the mmWave channel. The steps of the method can be performed by a processor of a receiver.

Figure 2:
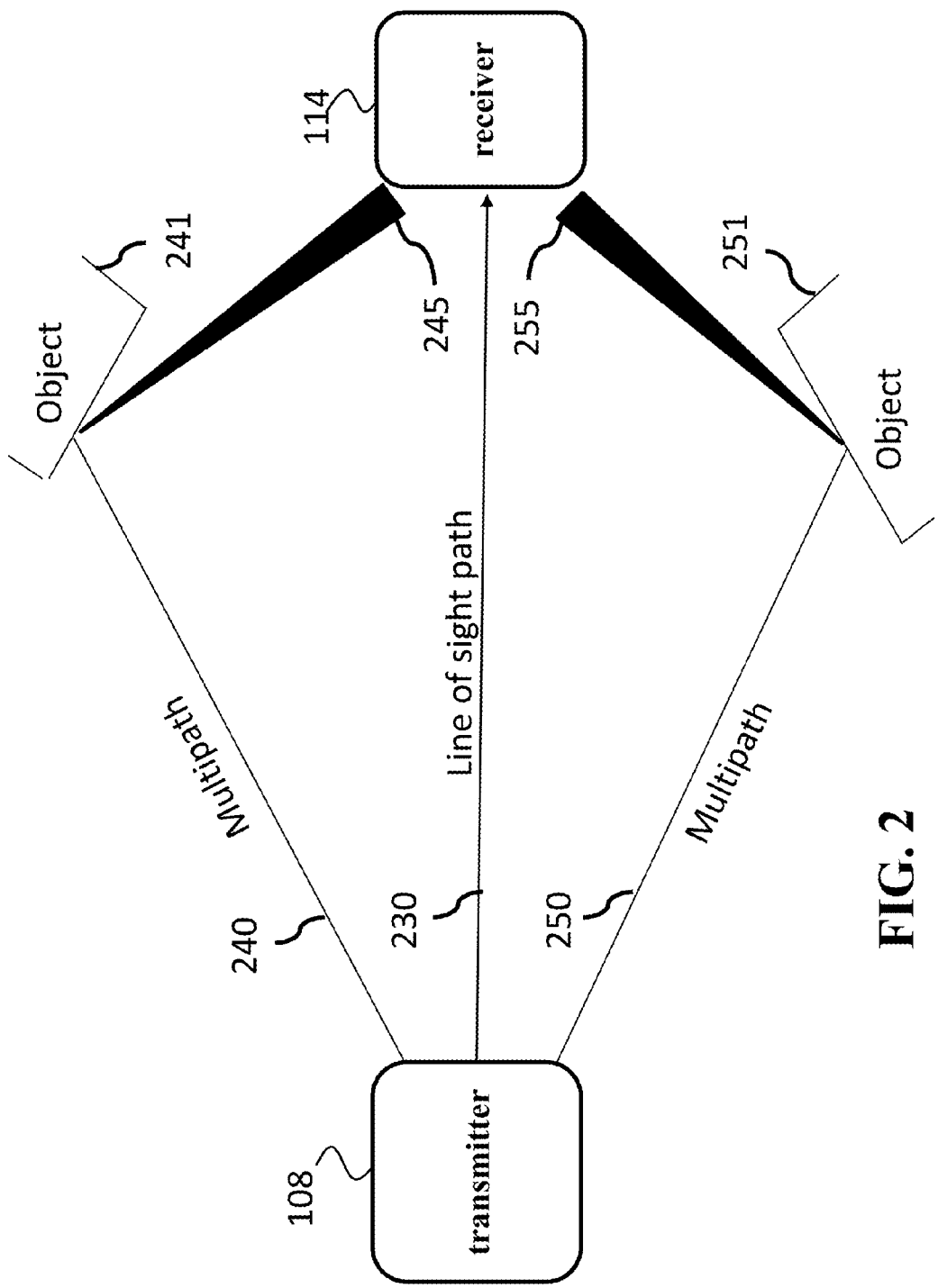
FIG. 2 shows schematic illustrating principles of propagation of the mmWaves in the mmWave channel employed by various embodiments of the invention.

FIG. 2 shows schematic illustrating principles of propagation of the mmWaves in the mmWave channel employed by various embodiments of the invention. For example, a signal sent from the transmitter 108 reaches the receiver 114 via few paths 230, 240 and 250. Since the wavelengths of the electro-magnetic waves in the mmWave system are likely comparable with the roughness of the object 241, 251 surfaces that bounce off the waves, the arrivals at the receiver are likely spread in the angular domain 245, 255. This feature has been confirmed in a number of reported measurement campaigns and is part of the existing standard IEEE 802.11ad for indoor mmWave communications at 60 GHz. Some embodiments of the invention exploit this observation to devise an enhanced channel estimation method.

Some embodiments of the invention are based on recognition that the mmWaves propagating in the mmWave channel are spread upon arrivals and departures, such that the mmWaves are detected as clusters of the mmWaves at the receiver. Due to the clustering, the statistics of the paths of mmWaves include statistics on locations of the clusters in a space of propagation of the mmWaves, and the statistics on the spread of mmWaves include statistics on a spread density of the cluster.

Figure 3:
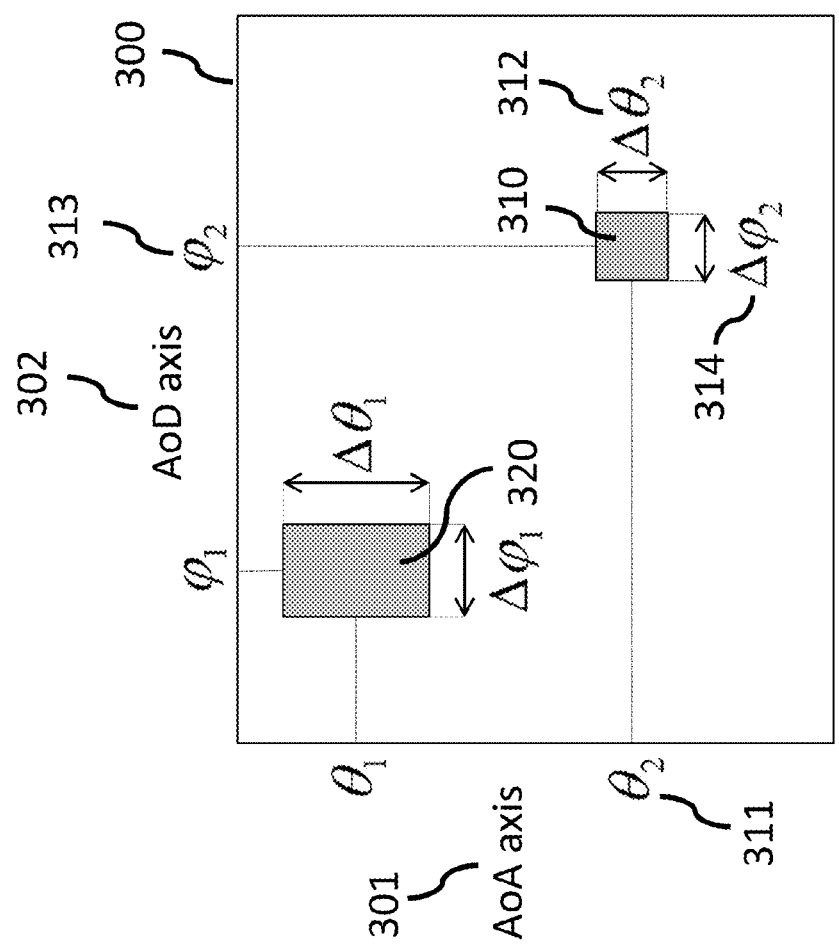
FIG. 3 shows a schematic of various metrics of statistic in the space of propagation of the mmWaves according to some embodiments of the invention.

FIG. 3 shows a schematic of various metrics of statistics in the space of propagation of the mmWaves according to some embodiments of the invention. For example, the space of propagation of the mmWaves can be represented as a Carterisan product of the set of possible angles of the directions of departure (DoD) of the mmWaves and angles of the directions of arrivals (DoA) of the mmWaves.

For example, one domain of the space of propagation in mmWave channel is a virtual angular domain, pictorially shown in FIG. 3 in the case where, without loss of generality, both transmitter and receiver employ vertical line arrays of antennas.

To arrive to a virtual angular domain representation of a channel in this specific example, we first assume that channel between each transmitter antenna element and each receiver antenna element is a flat fading channel, and thus represented via a single complex gain. All complex gain coefficients, corresponding to all possible pairs of transmitter and receiver antenna elements, are formatted into a channel matrix H, such that (i,j) entry in H represents a channel gain between the $i^{th}$ antenna element on the receiver side and the $j^{th}$ antenna element on the transmitter side.

The channel matrix H can be represented as $$H = A(\Theta_{rx}) H_s A(\Theta_{tx})^H, \quad (1)$$

where $\Theta_{tx} = [\theta_{tx,1}, \ldots, \theta_{tx,n_{tx}}]$ and $\Theta_{rx} = [\theta_{rx,1}, \ldots, \theta_{rx,n_{rx}}]$ are possible DoDs and DoAs of the propagation paths in the channel, and $A(\Theta_{rx})$, $A(\Theta_{tx})$ are matrices whose columns $\{a(\theta_{tx,i})\}_{i=1}^{n_{tx}}$, $\{a(\theta_{rx,i})\}_{i=1}^{n_{rx}}$ are manifold vectors corresponding to the respective DoD and DoA. Here, $H_s$ is the virtual angular domain representation of the channel.

The virtual angular domain can be pictorially represented as a two-dimensional grid 300, in which the DoA and DoD are represented with angles of arrival (AoA) 301 and angles of departure (AoD) 302 along the axis. A non-zero patch of energy 310 at, for example, AoA $\theta_2$ 311 and AoD $\phi_2$ 313, indicates that there is a path in a mmWave channel such that a signal transmitted in the beam in the direction $\phi_2$ and with width $\Delta\phi_2$ 314 reaches receiver from the direction of $\theta_2$ and has angular spread $\Delta\theta_1$ 312. The virtual angular representation of a mmWave channel shown in FIG. 3 indicates that there are two paths 310 and 320 between transmitter and receiver where each transmitted and received beam has some angular spread.

Because the mmWave channel is sparse in the number of paths between transmitter and receiver, some embodiments formulate the channel estimation problem as a problem of sparse representation of the received channel sensing signals in a redundant dictionary. The redundant dictionary includes atoms which depend on the transmitter and receiver manifold vectors. To that end, the channel can be estimated by employing one of a variety of sparse recovery methods, such as orthogonal matching pursuit (OMP) method.

Figure 4:
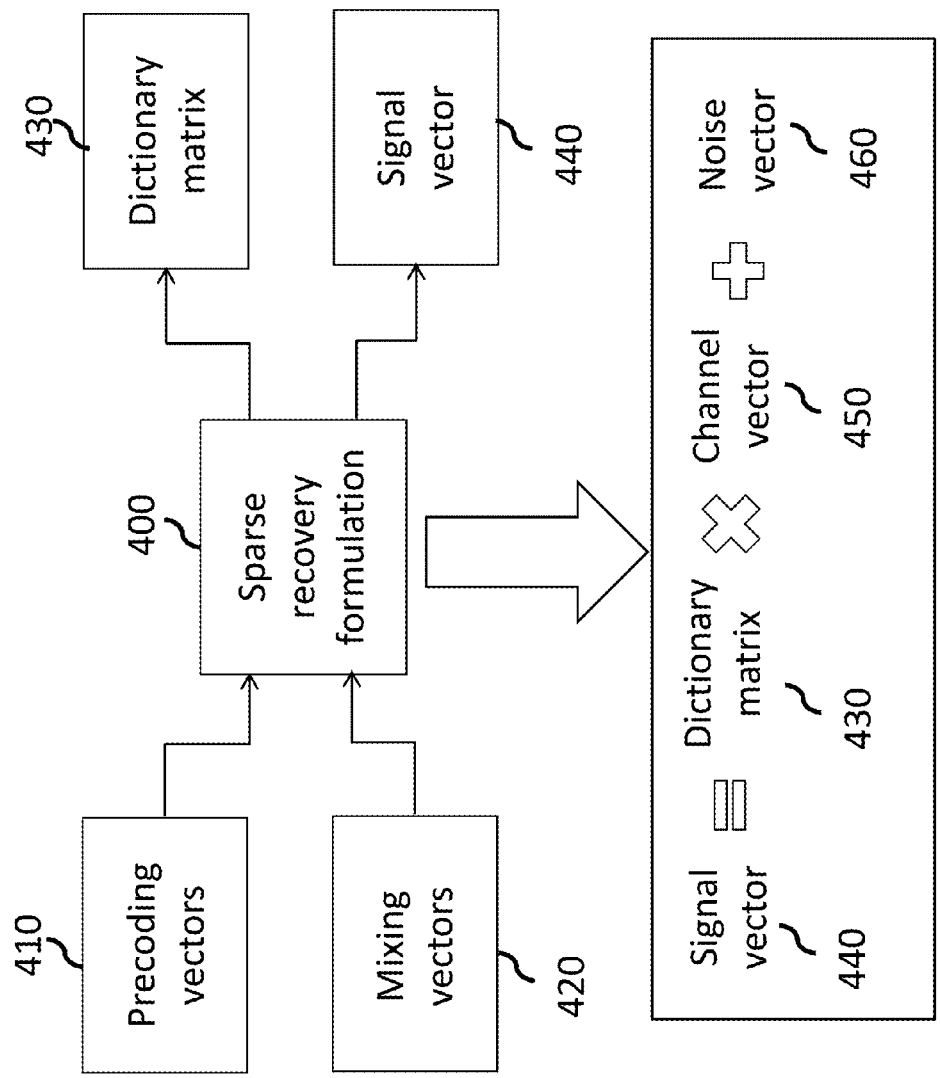
FIG. 4 shows a block diagram of a sparse recovery method of the channel estimation according to one embodiment of the invention.

FIG. 4 shows a block diagram of a sparse recovery method of the channel estimation according to one embodiment of the invention. The signal vector 440 can be obtained after pre-processing the test symbol received on a receiver array. The signal vector is represented as a product of a wide dictionary matrix 430 and a sparse channel vector 450, modified with noise 460. This representation can be obtained by transmitting a test symbol, e.g., a symbol with a known value one, after precoding the test symbol using a certain number of precoding vectors 410 and processing the received signal with a certain number of mixing vectors 420.

In some embodiments, non-zero elements of the channel vector include the coefficients of the channel state information, wherein values of the signal vector and the dictionary matrix are known from the test symbol and transmitter and receiver manifold vectors. For example, one embodiment determines the dictionary matrix and the signal vector from the precoding and mixing vectors, as well as transmitter and receiver manifold vectors, using various algebraic operations which encompass sparse recovery formulation 400.

For example, suppose a transmitter sends a data symbol $t = 1$ and applies precoding vectors $\{p_i\}_{i=1}^m$ in m successive time steps. The precoding vectors are of size equal to the number of transmitter antenna elements and, in general, may contain random or pseudo-random complex exponentials. The receiver employs corresponding mixing vectors $\{q_i\}_{i=1}^m$ to the signals received on its antenna elements. The mixing vectors are of size equal to the number of employed antenna elements and may contain random or pseudo-random complex exponentials.

The $i^{th}$ observed data snapshot (i.e., signal across receiver antenna elements) is therefore given by $$y_i = \sqrt{\rho} \, q_i^H H p_i t + q_i^H z = \sqrt{\rho} \, q_i^H A(\Theta_{rx}) H_s A(\Theta_{tx})^H p_i t + e_i, \quad (2)$$

where $\rho$ is the SNR, $e_i \sim \mathcal{CN}(0, \sigma_n^2)$ is the measurement noise, and H, $A(\Theta_{rx})$, $A(\Theta_{tx})$ and $H_s$ are as defined in (1).

From properties of the Kronecker product, we know that for any matrices A, B, C, $$\text{vec}(ABC) = (C^T \otimes A)\text{vec}(B), \quad (3)$$

where the vec(·) operation rearranges the elements of its operand columnwise into a vector. Using (3) in (2), we get $$y_i = \sqrt{\rho}(p_i^T \otimes q_i^H)(A(\Theta_{tx})^* \otimes A(\Theta_{rx}))\text{vec}(H_s) + e \quad (4)$$

Stacking up the m data snapshots obtained in m consecutive time steps into a vector, we get:

$$\underbrace{\begin{bmatrix} y_1 \\ \vdots \\ y_m \end{bmatrix}}_{:=y} = \sqrt{\rho} \underbrace{\begin{bmatrix} p_1^T \otimes q_1^H \\ \vdots \\ p_m^T \otimes q_m^H \end{bmatrix} (A(\Theta_{tx})^* \otimes A(\Theta_{rx}))}_{:=A} \underbrace{\text{vec}(H_s)}_{:=x} + e, \quad (5)$$

where we refer to y as signal vector 440, A is dictionary matrix 430, x is channel vector 450, and e is noise vector 460. We reiterate that the signal vector and dictionary matrix are computed from the precoding and mixing vectors, as well as from the transmitter and receiver manifold vectors. The channel estimation problem then boils down to finding a sparse representation of the signal vector 440 in the redundant dictionary 430, where the coefficients of the sparse representation constitute unknown channel vector 450. The estimated channel vector is then mapped back to the representation in the virtual angular domain $H_s$, which, in turn, is mapped to channel matrix H, using (1).

Figure 5:
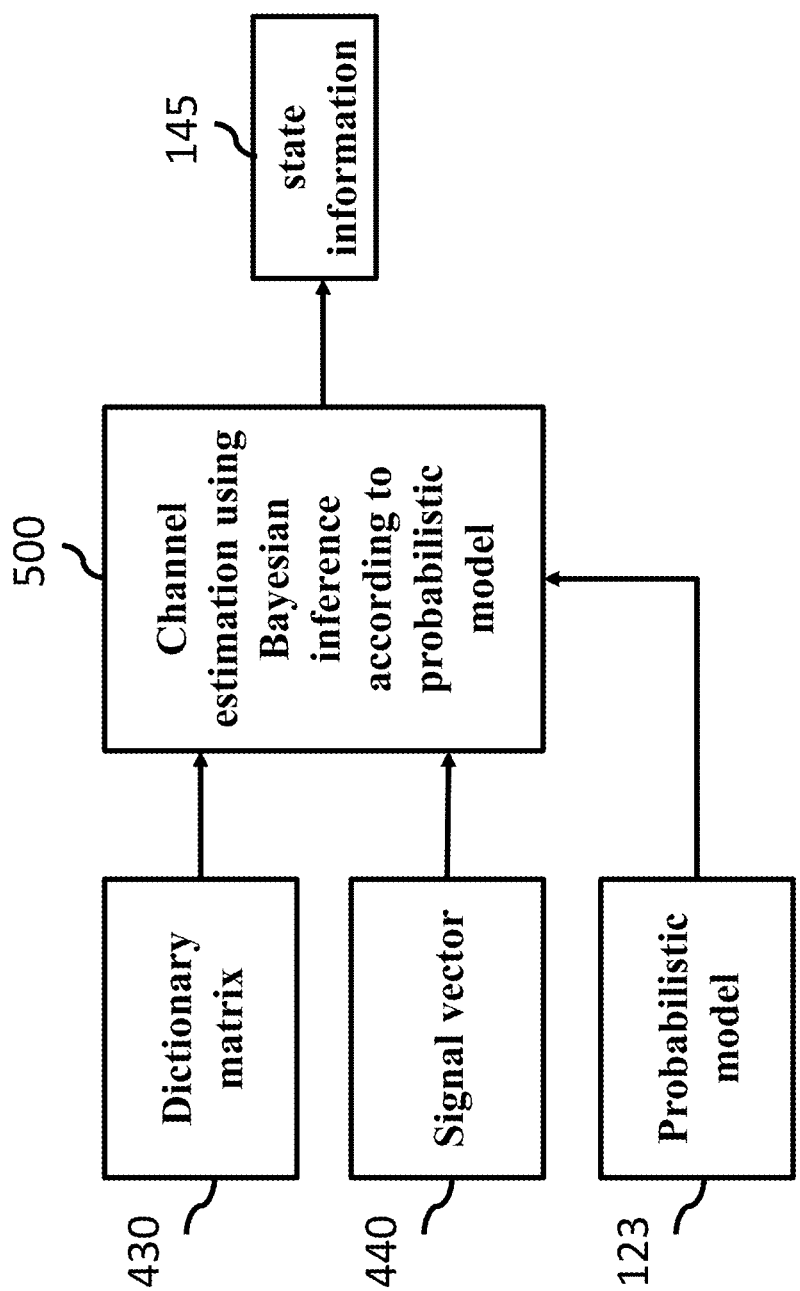
FIG. 5 shows a block diagram of a method for estimating state of the mmWave channel using Bayesian inference according to some embodiments of the invention.

FIG. 5 shows a block diagram of a method for estimating mmWave channel using Bayesian inference according to some embodiments of the invention. The proposed channel estimation method takes as inputs the dictionary matrix 430, the signal vector 440 and the probabilistic model 123 as inputs and produces the state information 145 of the mmWave channel. The embodiments can determine the dictionary matrix 430 and the signal vector 440 from known value of the test symbol and manifold vectors of the transmitter 108 and the receiver 114, as described above.

One embodiment of the invention determines the probabilistic model 123 based on a type of environment where mmWave channel is established. For example, the embodiment can determine a set of probabilistic models for different types of environments, determine a type of an environment where mmWave communication is established, and select the probabilistic model of the mmWave channel corresponding to the type of the environment for propagating the mmWave. Example of the types of the environment include an environment for propagating mmWaves in an office building, an environment for propagating mmWaves in a residential building, and an environment for propagating mmWaves outdoors.

The probabilistic models for different types of the environments can be extracted from the experimental channel measurements reported in the literature. In addition, a separate measurement campaign with the goal to obtain probabilistic models of the environments of interest could be conducted. For example, IEEE 802.11ad standard provides characteristics of variety of indoor mmWave channels that could be used to formulate probabilistic models needed for the embodiments of this invention.

Some embodiments of the invention determine 500 the state information 145 in two stages. For example, one embodiment determines a support of the mmWave channel defining portions of a space of propagation of the mmWaves where the mmWave channel has non-zero energy and, then, determines coefficients of the state information corresponding to the portions of the space of propagation having non-zero energy.

Figure 6:
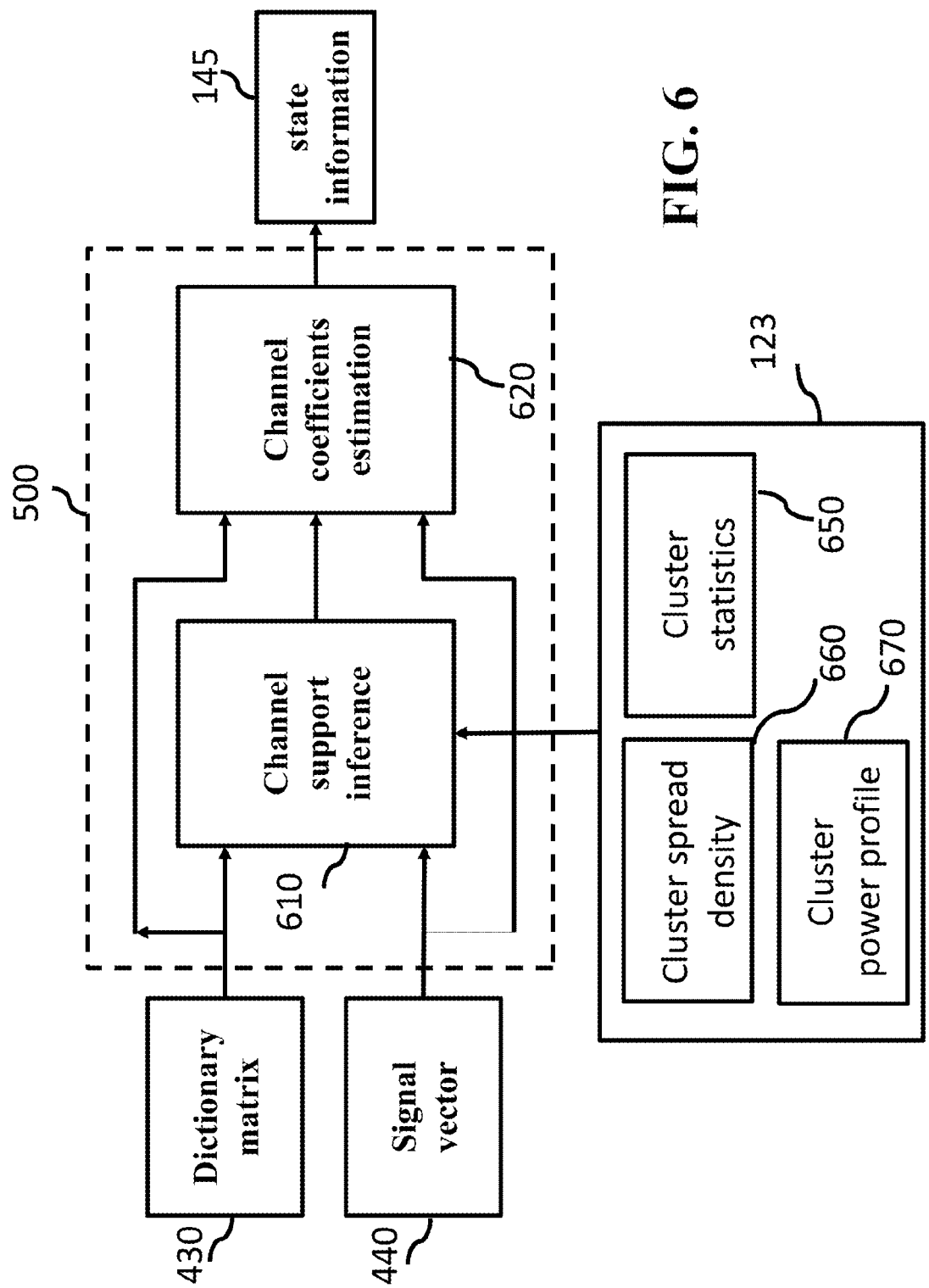
FIG. 6 shows a block diagram of a two-stage method for determining the state information 145 according to one embodiment of the invention.

FIG. 6 shows a block diagram of a two-stage method for determining the state information 145 according to one embodiment of the invention. In the first stage 610, the embodiment determines the non-zero support of the channel vector. In other words, this stage finds which entries in a sparse and long channel vector are indeed non-zero. In doing so, the dictionary matrix 430, signal vector 440 and channel model 123 are exploited.

Formally, the support is represented with a vector s whose length is equal to the length of the channel vector and entries are given by $$s_i = \begin{cases} 1 & \text{if } x_i \neq 0 \\ 0 & \text{if } x_i = 0 \end{cases} \text{ for } i = 1, \ldots, n. \quad (6)$$

For example, the support can be determined using the Bayesian inference by determining a prior probability of the support probabilistically encouraging the spread of upon arrivals of the mmWaves and determining, using the prior probability, the support as a configuration of the portions of the space resulting in an increase of posterior probability for the received test symbol.

The second stage 620 estimates channel coefficients at the non-zero entries in the channel vector. For example, the coefficients of the state information are determined by a fitting method reducing a difference between an estimated value of the test symbol determined using the state information of the mmWave channel and a known value of the test symbol.

For example, because the mmWaves propagating in the mmWave channel are spread upon arrivals and departures, the mmWaves are detected as clusters of the mmWaves at the receiver. To that end, the statistics 125 of the paths of mmWaves include cluster statistics 650 on locations of the clusters in a space of propagation of the mmWaves. Similarly, the statistics 126 on the spread of mmWaves include cluster spread density 660 on a spread density of the cluster, and the statistics 127 on the power profile include statistics 670 on power profile of the clusters.

For example, the cluster statistics 650 can be specified with the probability distribution of the number of clusters, or exact number of clusters characteristic for a mmWave channel of interest. The cluster spread density 660 represents probability density function of the angular spread of each cluster. For example, widths of the clusters in the mmWave channel can be a magnitude of a Gaussian distribution. The clusters in a channel may have the same or different spread densities. Also, the cluster power profile 670 can specify how power changes across the angular spread. For example, the power profile of the mmWave channel can be modeled according to an exponentially decaying function, specifying, e.g., that the power of the signal within a cluster exponentially decays with respect to the center of a cluster.

An example of the statistics of the mmWave channel paths used in some of the embodiments is summarized in Table below. The received energy arrives in clusters, whose number $n_c$ is uniformly distributed between 1 and $c_{max}$, where the maximum number of received clusters is environment dependent. This information represents cluster statistics 650 in this example. Cluster i has DoA spread of $\Delta\theta_i$ at the receiver. The cluster spread has Gaussian probability density of zero mean, variance $\sigma^2$ and is truncated between $$-\frac{\pi}{2}$$

and $$\frac{\pi}{2}$$

when receiver employs linear array. The intracluster ray powers decay exponentially with angular distance from the center of the cluster. The ray coefficients are complex Gaussian distributed with zero mean and variance equal to the power of ray determined from the cluster power profile.

TABLE 1

Example of mm Wave channel statistics used in some embodiments

| Parameter | Variable | Expr./Distrib. |
|---|---|---|
| Max. number of clusters | $c_{max}$ | fixed |
| Realized number of clusters | $n_c$ | Unif $(\{1, \ldots, c_{max}\})$ |
| DoA spread | $\Delta\theta$ | $\dfrac{|\mathcal{N}(0, \sigma_{sp}^2)|}{\Phi([-\pi/2, \pi/2], 0, \sigma_{sp}^2)}$ |
| Intracluster power decay | $p_{\theta,c}$ | $e^{|\theta-\theta_0|/\delta}$ |
| Ray coefficients | $h_{\theta,c}$ | $CN(0, p_{\theta,c})$ |

Some embodiments determine the support 610 in the virtual angular domain as the one which maximizes the posterior distribution p(s|y) of support s conditioned on signal vector y. In other words, ŝ=argmax$_s$p(s|y). For example, one embodiment performs the maximization via exhaustive search over all possible supports. For example, the set of possible supports can be predetermined, randomly generated or include all possible combinations of the supports. To that end, the embodiment selects a set of possible supports and determines the posterior distribution of each support in the set. The embodiment selects the support resulting in the maximal posterior distribution.

However, this embodiment can be computationally infeasible and different embodiment use different search strategies. For example, an alternative embodiment selects the set of supports such that each support in the set for a number of clusters K includes a support having a maximal posterior distribution among supports for a number of clusters K−1. For example, the embodiment determines the most likely support of size one, then considers all supports of sizes two that include the support found in the previous iteration. In an iteration k, all supports of size k, which include most likely support of size k−1 found up to the previous iteration, are considered.

Figure 7A:
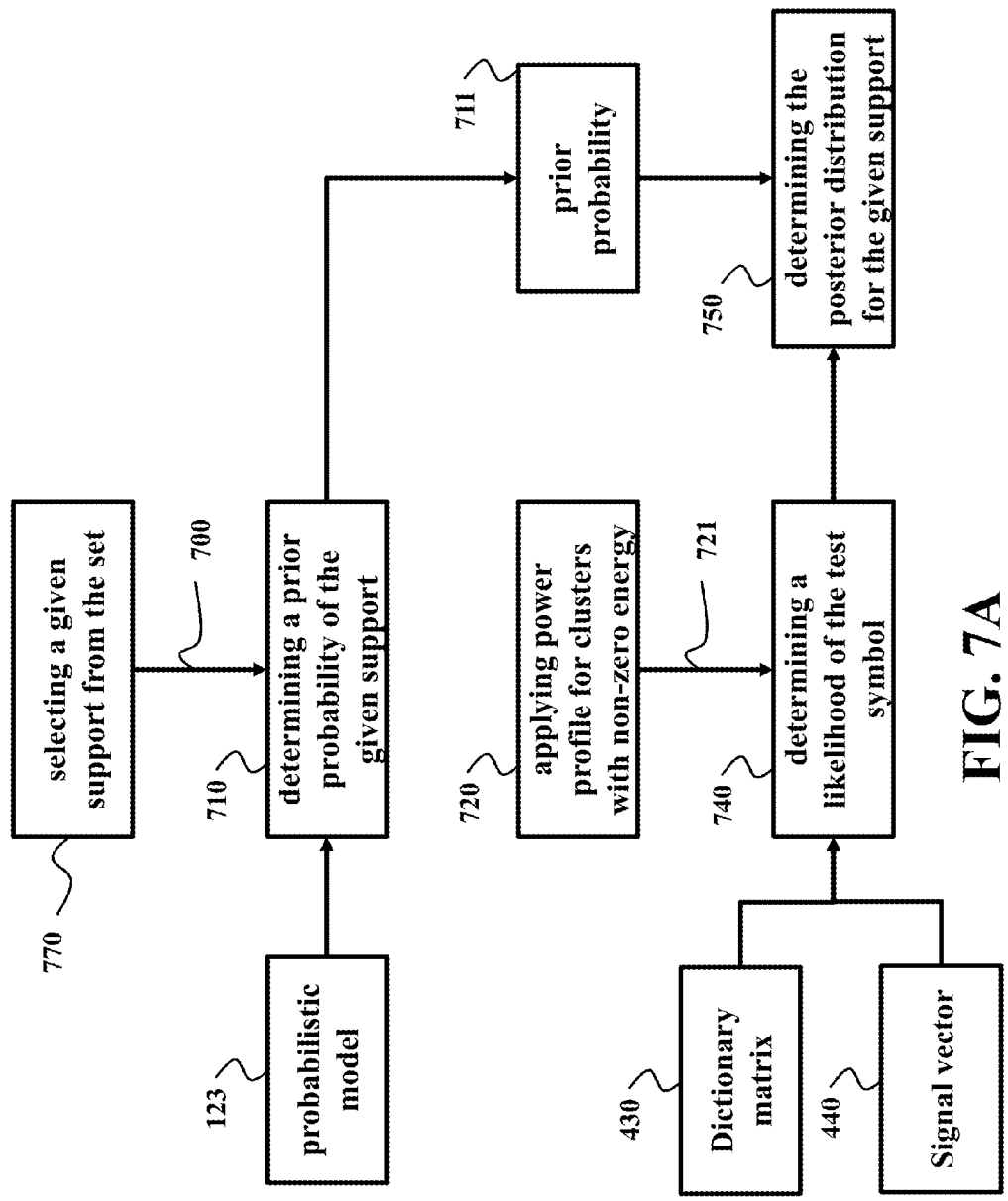
FIG. 7A shows a block diagram for evaluating a support according to one embodiment of the invention.

FIG. 7A shows a block diagram for evaluating a support according to one embodiment of the invention. The method selects 770 a given support 700 from the set and determines 710 a prior probability 711 of the given support using the probabilistic model 123 of the mmWave channel. The given support 700 specifies the cluster with non-zero energy and the method applies 720 a power profile 721 for each cluster with non-zero energy indicated by the given support. Next, the method determines 740 a likelihood of the test symbol using the signal vector 440, the dictionary matrix 430 and the power profiles 721 of the clusters and determines, up to a constant scaling, 750 the posterior distribution for the given support as a product of the likelihood of the test symbol and the prior probability.

Figure 7B:
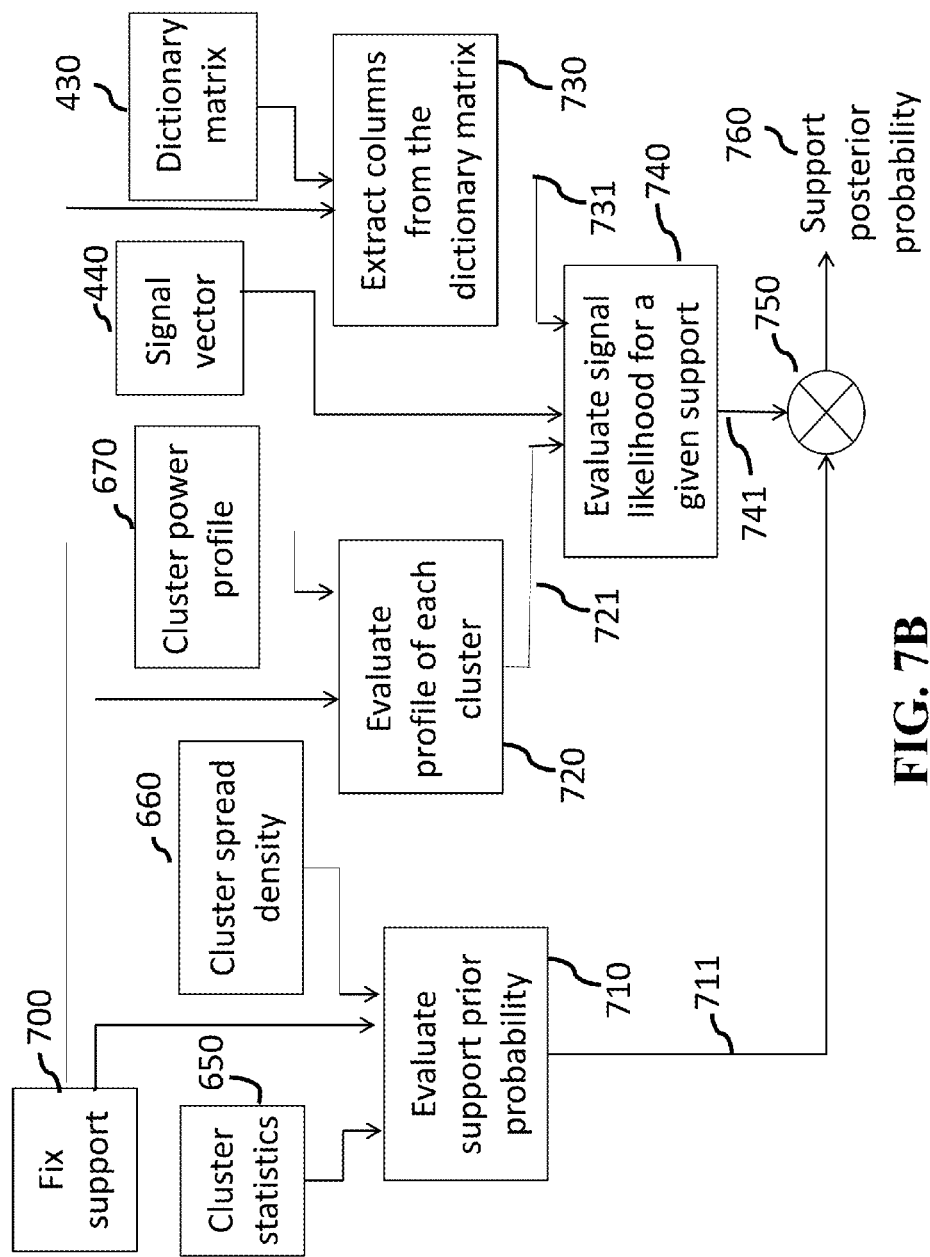
FIG. 7B shows an exemplar computation of a posterior probability according to one embodiment of the invention.

FIG. 7B shows an exemplar computation of a posterior probability p(s|y) according to one embodiment. First, for a given support 700, cluster spread density 660 and cluster statistics 650, the prior probability of given support ℙ (s) is computed in 710. The fixed support 700 and cluster power profile 670 are used to evaluate profile of each cluster in 720 indicated by the fixed support. The fixed support 700 indicates which columns in the dictionary matrix to extract in 730. The signal vector 440, profile of each cluster 721 and the extracted columns from the dictionary 731 are used to evaluate signal likelihood in 740. The prior 711 and likelihood 741 are multiplied 750 to yield desired posterior probability 760, up to a normalization constant.

For example, the likelihood of the signal vector conditioned on the support, p(y|s) could be computed in the following manner. Let $A_s$ denote the matrix obtained from the columns of the dictionary matrix A with indices i such that $s_i$=1. Similarly, let $x_s$ be a vector whose elements are the elements of vector of x with indices i such that $s_i$=1. Assuming that noise e in (5) has complex circularly symmetric Gaussian distribution of zero mean and variance $\sigma_n^2$, the density of data, conditioned on considered support s and $x_s$ is given by $$p(y|x_s, s) = \frac{1}{(\pi\sigma_n^2)^{n}} \exp\left\{-\frac{\|y - A_s x_s\|_2^2}{\sigma_n^2}\right\}. \quad (7)$$

The density of $x_s$ given the support s is in this example given by $$p(x_s|s) = \frac{1}{|\pi\Sigma_s|} \exp\{-x_s^H \Sigma_s^{-1} x_s\} \quad (8)$$

where $\Sigma_s$ is the signal covariance matrix which could be obtained from the cluster power profile.

The density of data given the signal support configuration is evaluated by $p(y|s)=\int_{x_s} p(y|x_s,s)p(x_s|s)dx_s$. Define $$Q_s := A_s^H A_s + \sigma_n^2 \Sigma_s^{-1}.$$

Then computing p(y|s) gives us $$p(y|s) = \frac{1}{(\pi\sigma_n^2)^{(n-s)}} \frac{1}{|\pi\Sigma_s|} \frac{1}{|Q_s|^{1/2}} \exp\left\{-\frac{\|y\|_2^2 + y^H A_s Q_s^{-1} A_s^H y}{\sigma_n^2}\right\}. \quad (9)$$

Denoting with ℙ (s) the prior probability of support s, the posterior probability of support s conditioned on data y is up to normalization constant evaluated as $$p(s|y) \propto \mathbb{P}(s)p(y|s) \quad (10)$$

Figure 8A:
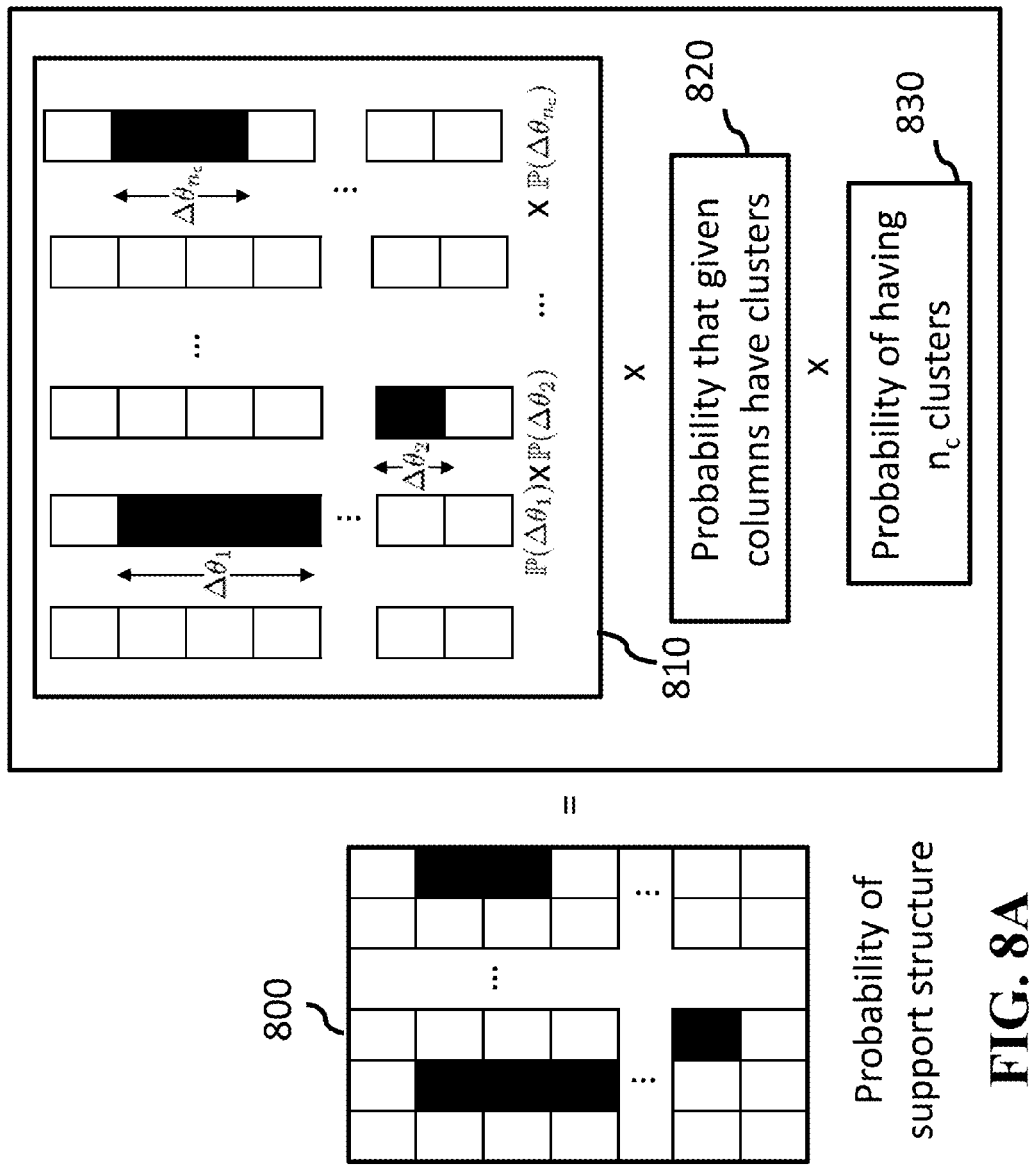
FIG. 8A shows a schematic of determining the prior probability according to one embodiment of the invention.

FIG. 8A shows a schematic of determining the prior probability according to one embodiment of the invention. This embodiment determines the prior probability as a product of a probability that the support has a number of clusters as in the given support, a probability that the support has the number of clusters in columns indicated by the given support, and a probability that the clusters in the support are spread as indicated by the given support.

In the example of FIG. 8A, the given support shown in the virtual angular domain representation 800 and has three clusters, each covering one bin along the AoD axis and a certain number of bins along the AoA axis. The prior probability of such a support is given as a product of a probability that the support has three clusters 830, probability that given columns have clusters where indicated 820, and probability 810 that each cluster has spread as indicated by the support matrix. The probability 810 can be determined as a product of probabilities that the three clusters have spreads $\Delta\theta_1$, $\Delta\theta_2$ and $\Delta\theta_3$.

Figure 8B:
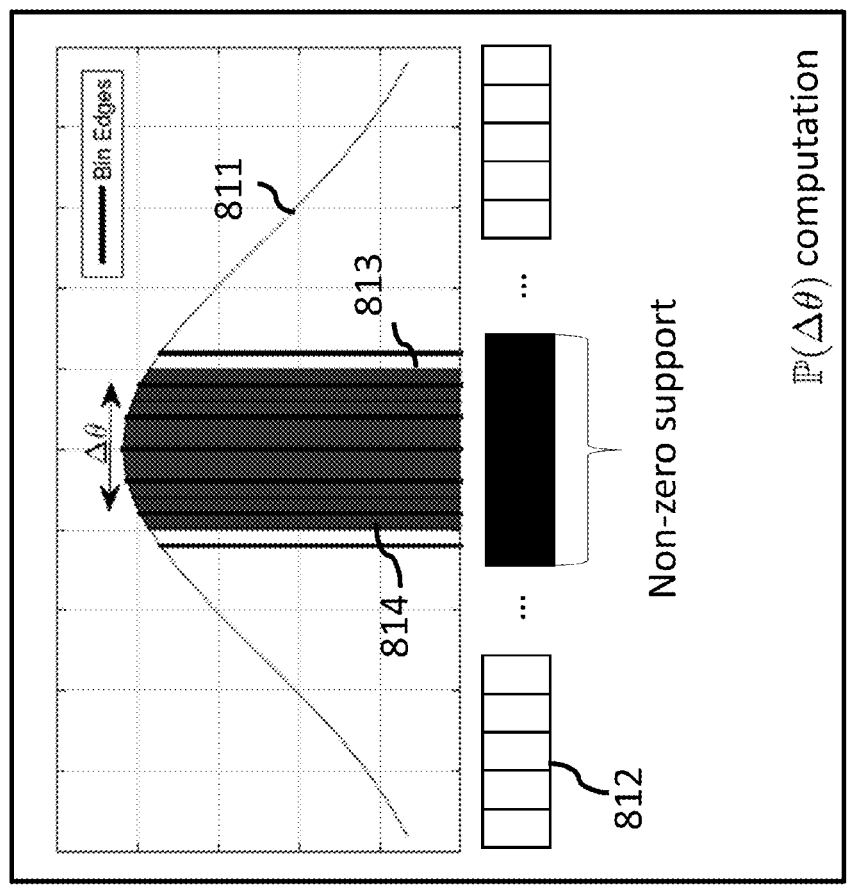
FIG. 8B shows a schematic of determining the probability of the spread of the clusters according to one embodiment of the invention.

FIG. 8B shows a schematic of determining the probability of the spread of the clusters according to one embodiment of the invention. The probability that a cluster has a particular spread $\Delta\theta$ is obtained from the cluster spread density. For example, the probability of the spread of the cluster is determined according to an area defined by the spread density 811 of the cluster over a length of the cluster. For an exemplar cluster support 812, the probability of the cluster spread is equal to the area below the curve 811 under the leftmost 814 and rightmost 813 bins.

In the following example, the clusters span one bin in the DoD domain and a number of bins in the DoA domain, and compute the support prior probability. Some embodiments determine support prior p(s) by partitioning s defined in (6) into blocks of length $n_{rx}$, as $s=[s_1 \ldots s_{n_{tx}}]^T$, i.e., support indicator corresponding to columns of $H_s$. Let $c_i$ be the indicator of cluster presence in column i, for $i=1, \ldots, n_{tx}$, and $c=[c_1 \ldots c_{n_{tx}}]^T$, then $$\mathbb{P}(s) = \mathbb{P}(s|c, n_c)\mathbb{P}(c|n_c)\mathbb{P}(n_c). \tag{11}$$

From the distribution of $n_c$ specified in Table 1, $$\mathbb{P}(n_c) = \frac{1}{c_{max}}.$$

Because the clusters are distributed randomly from among the $n_{tx}$ columns of $H_s$, $\mathbb{P}(c|n_c)=1/\binom{n_{tx}}{n_c}$, where $\binom{n_{tx}}{n_c}$ denotes "$n_{tx}$ choose $n_c$". If there is no spread in DoD, then $\mathbb{P}(s|c, n_c)=\Pi_{i:c_i=1}\mathbb{P}(s_i|c_i, n_c)$. Because the signal energy is present in a continuous band of angles around the cluster center, locations in which $s_i=1$ occur contiguously. Therefore, some embodiments only need to compute probabilities of the form $$\mathbb{P}\left(s_i = [0, \ldots, 0, \underbrace{1}_{j}, \ldots, \underbrace{1}_{j+k}, 0, \ldots, 0] \middle| c_i, n_c\right). \tag{12}$$

Operating in the sine-angle domain, let $\phi:=\sin(\theta)$ and $\Delta\phi_w$ be the resolution of the dictionary $\sin(\Theta_{rx})$. Consider (12), in which a cluster spans from index j to j+k. Therefore, probability of this cluster is given by $$\mathbb{P}\left(\Delta\phi_- \in \left[\phi_0 - \frac{k}{2}\Delta\phi_w, \phi_0 - \frac{k-1}{2}\Delta\phi_w\right], \tag{13}\right.$$

$$\left.\Delta\phi_+ \in \left[\phi_0 + \frac{k-1}{2}\Delta\phi_w, \phi_0 + \frac{k}{2}\Delta\phi_w\right] \middle| \phi_0 = \phi_{\frac{j+k}{2}}\right)$$

When DoA spread is symmetric about its center, and independent of center location is $$\mathbb{P}(s_i|c_i, n_c) = 2\mathbb{P}\left(\Delta\phi_+ \in \left[\frac{k-1}{2}\Delta\phi_w, \frac{k}{2}\Delta\phi_w\right]\right). \tag{14}$$

This probability can be computed directly from the density of $\Delta\theta$. With that, the computation of $\mathbb{P}(s)$ is completed.

Figure 9:
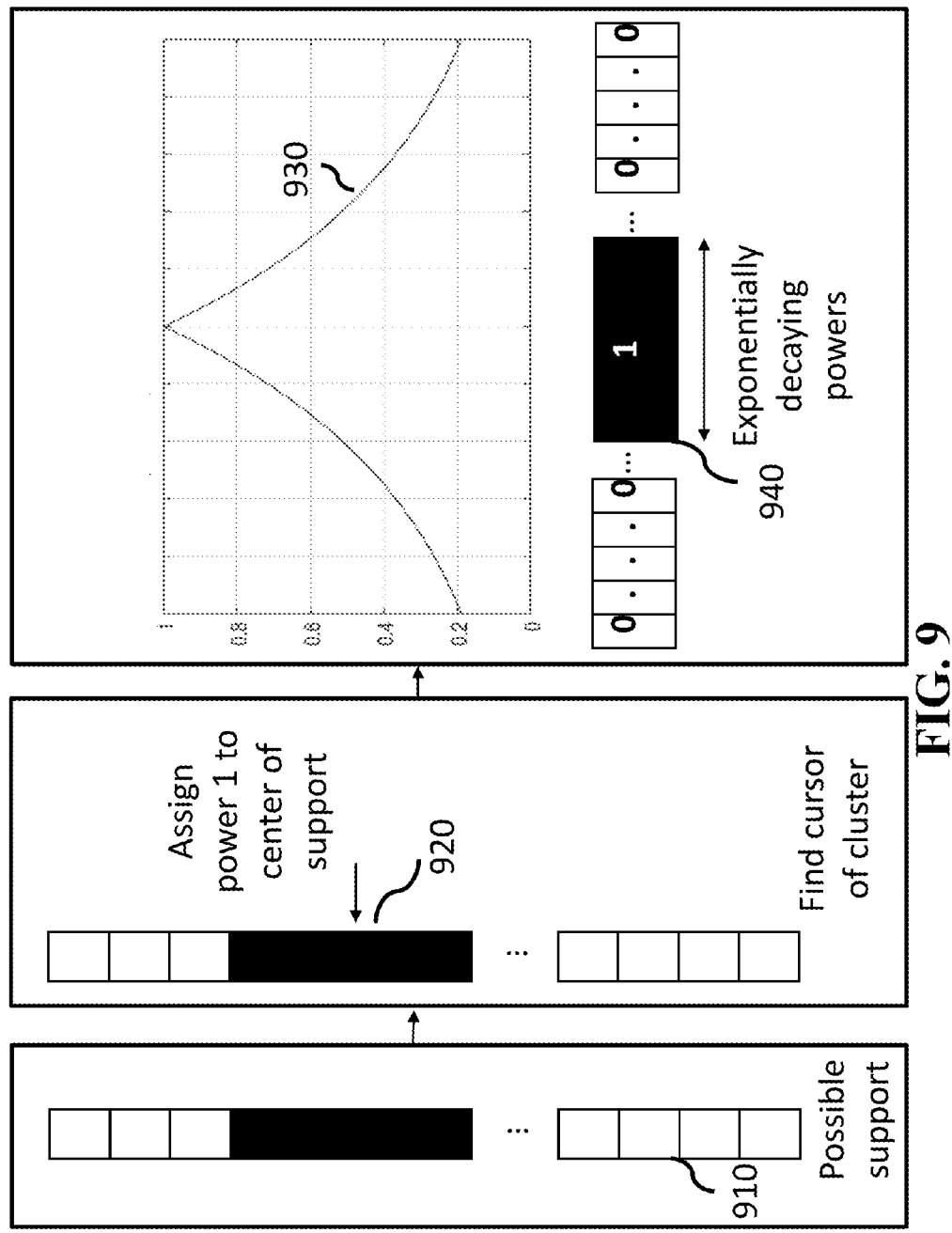
FIG. 9 shows a schematic of evaluation of a power profile of a cluster according to one embodiment of the invention.

FIG. 9 shows a schematic of evaluation of a power profile of a cluster according to one embodiment of the invention. This embodiment determines the power profile of the cluster according to an energy decaying function of energy of the mmWave centered at a center of the cluster. For example, if a candidate cluster has support 910, the embodiment assigns normalized power of one to the center of the support 920. The power assigned to other bins corresponding to the non-zero support is as specified according to the cluster power profile. In this example, the energy decaying function is exponentially decaying function 930 and is applied to the candidate cluster support to yield exponentially decaying profile over the non-zero support 940.

FIG. 10 shows a block diagram of a method for determining the channel coefficients. The columns of the dictionary matrix 430 which correspond to the estimate of the channel support 950 are extracted. Then, the signal vector 440 is represented in the space spanned by the extracted columns in 960. For example, one embodiment represents the signal vector as a linear combination of the extracted columns where the coefficients in the linear combination are obtained by minimizing the mean square error between the signal vector and its representation. The vector of the obtained coefficients is the channel estimate 560 over the non-zero support.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a symbol transmitted over a millimeter wave (mmWave) channel from a transmitter to a receiver, comprising:
    receiving, using a set of antennas of the receiver, symbols transmitted over the mmWave channel from the transmitter to the receiver;
    converting, using a front end of the receiver, the symbols into at least a test symbol and a data symbol;
    estimating, using a probabilistic channel estimator of the receiver, channel state information (CSI) of the mmWave channel using a Bayesian inference on the test symbol according to a probabilistic model of the mmWave channel including statistics on paths and spread of mmWaves propagating in the mmWave channel, wherein the probabilistic channel estimator is implemented using a processor executing software instructions estimating the CSI using the Bayesian inference;
    and
    decoding, using a decoder of the receiver, the data symbol using the CSI, wherein steps of the method are performed by the processor of the receiver.

2. The method of claim 1, further comprising:
    determining a type of an environment for propagating the mmWave in the mmWave channel; and
    selecting the probabilistic model of the mmWave channel corresponding to the type of the environment for propagating the mmWave.

3. The method of claim 2, further comprising:
    determining a set of probabilistic models for different types of the environment for propagating the mmWave.

4. The method of claim 1, wherein the mmWaves propagating in the mmWave channel are spread upon arrivals and departures, such that the mmWaves are detected as clusters of the mmWaves at the receiver, wherein the statistics of the paths of mmWaves include statistics on locations of the clusters in a space of propagation of the mmWaves, and wherein the statistics on the spread of mmWaves include statistics on a spread density of the cluster, and wherein the probabilistic model of the mmWave channel includes statistics on power profile of the clusters.

5. The method of claim 4, wherein the space of propagation of the mmWaves is a Carterisan product of a set of angles of directions of departure (DoD) of the mmWaves and angles of directions of arrivals (DoA) of the mmWaves.

6. The method of claim 1, further comprising:
    determining a support of the mmWave channel defining portions of a space of propagation of the mmWaves where the mmWave channel has non-zero energy; and
    determining coefficients of the state information corresponding to the portions of the space of propagation having non-zero energy.

7. The method of claim 6, wherein the support is determined using the Bayesian inference comprising:
    determining a prior probability of the support probabilistically encouraging the spread of the mmWaves; and
    determining, using the prior probability, the support as a configuration of the portions of the space resulting in an increase of posterior probability for the received test symbol.

8. The method of claim 6, wherein the coefficients of the state information are determined by a fitting method reducing a difference between an estimated value of the test symbol determined using the state information of the mmWave channel and a known value of the test symbol.

9. The method of claim 6, wherein the coefficients of the state information are determined using a sparse recovery, wherein a signal vector is represented as a product of a dictionary matrix and a channel vector, modified with noise, wherein non-zero elements of the channel vector include the coefficients of the state information, and wherein values of the signal vector and the dictionary matrix are known from the test symbol.

10. The method of claim 9, wherein the support of the mmWave channel defines positions of the non-zero elements of the channel vector, further comprising:
    determining the support maximizing posterior distribution $p(s|y)$ of the support s conditioned on the signal vector y according to $$\hat{s} = \mathrm{argmax}_s p(s|y).$$

11. The method of claim 10, further comprising:
    selecting a set of supports;
    determining the posterior distribution of each support in the set; and
    selecting the support resulting in the maximal posterior distribution.

12. The method of claim 11, selecting the set of supports such that each support in the set for a number of clusters K includes a support having a maximal posterior distribution among supports for a number of clusters K−1.

13. The method of claim 11, further comprising:
    selecting a given support from the set;
    determining a prior probability of the given support using the probabilistic model of the mmWave channel;
    determining a power profile for each cluster with non-zero energy indicated by the given support;
    determining a likelihood of the test symbol using the signal vector, the dictionary matrix and the power profiles of the clusters; and
    determining the posterior distribution for the given support as a product of the likelihood of the test symbol and the prior probability.

14. The method of claim 13, wherein the prior probability is determined as a product of a probability that the support has a number of clusters as in the given support, a probability that the support has the number of clusters in columns indicated by the given support, and a probability that the clusters in the support are spread as indicated by the given support.

15. The method of claim 14, wherein the probability of the spread of the clusters are determined as a product of probabilities of spreads of each cluster in the given support.

16. The method of claim 15, further comprising:
    determining the probability of the spread of the cluster according to an area defined by the spread density of the cluster over a length of the cluster.

17. The method of claim 13, further comprising:
    determining the power profile of the cluster according to an energy decaying function of energy of the mmWave centered at a center of the cluster.

18. A receiver for receiving and decoding symbols transmitted over a millimeter wave (mmWave) channel, comprising:
    a set of antennas to receive symbols transmitted over the mmWave channel;
    a front end to convert the symbols into a test symbol and a data symbol;
    a processor to estimate channel state information (CSI) of the mmWave channel using a Bayesian inference on the test symbol according to a probabilistic model of the mmWave channel including statistics on paths and spread of mmWaves propagating in the mmWave channel; and a decoder to decode the data symbol using the CSI.

19. The receiver of claim 18, wherein the processor determines a support of the mmWave channel defining portions of a space of propagation of the mmWaves where the mmWave channel has non-zero energy, wherein the support is determined using the Bayesian inference as a configuration of the portions of the space resulting in an increase of posterior probability for the mmWave channel, and wherein the processor determines coefficients of the state information at the portions of the space of propagation having non-zero energy, wherein the coefficients of the state information are determined by a fitting method reducing a difference between an estimated value of the test symbol determined using the state information of the mmWave channel and a known value of the test symbol, wherein the processor is configured to determine a prior probability of the given support using the probabilistic model of the mmWave channel;

determine a power profile for each cluster with non-zero energy indicated by the given support;

determine a likelihood of the test symbol using the signal vector, the dictionary matrix and the power profiles of the clusters; and determine the posterior distribution for the given support as a product of the likelihood of the test symbol and the prior probability, up to a normalization constant.

20. A non-transitory computer readable storage medium embodied thereon a program executable by a processor of a receiver for performing a method, the method comprising:

estimating channel state information (CSI) of the mmWave channel using a Bayesian inference on a test symbol received over the mmWave channel, wherein the estimating is according to a probabilistic model of the mmWave channel including statistics on paths and spread of mmWaves propagating in the mmWave channel; and decoding a symbol received over the mmWave channel using the CSI.

* * * * *